May 18, 1954 W. BAHLSEN 2,678,614
BAKING APPARATUS
Filed April 19, 1950 3 Sheets-Sheet 3

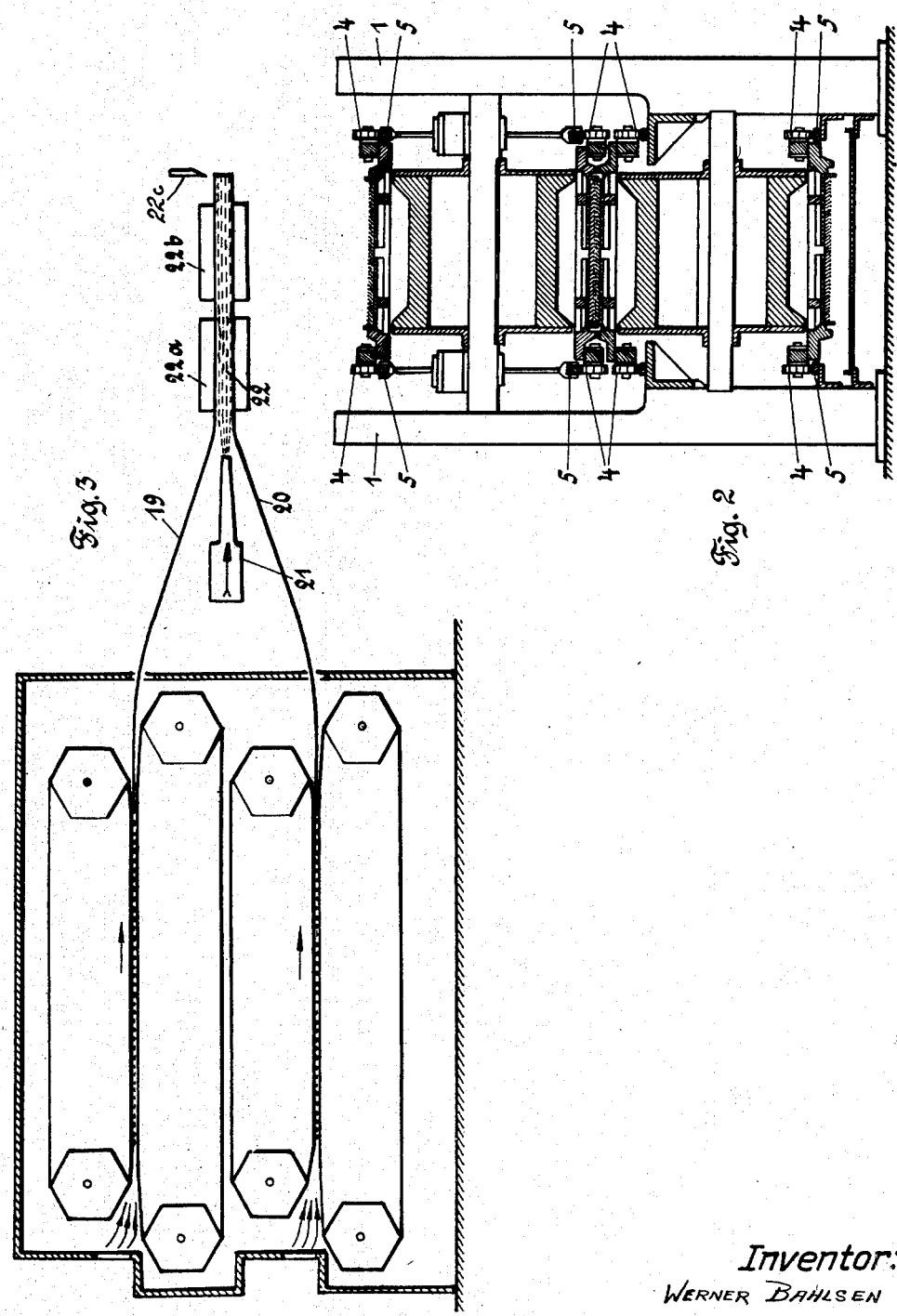

Inventor:
WERNER BAHLSEN
By Bailey, Stephens & Huettig
ATTORNEYS

Patented May 18, 1954

2,678,614

UNITED STATES PATENT OFFICE 2,678,614

BAKING APPARATUS

Werner Bahlsen, Hannover, Germany

Application April 19, 1950, Serial No. 156,768

Claims priority, application Austria May 14, 1949

7 Claims. (Cl. 107—57)

The present invention relates to an apparatus for making baked products and in particular filled wafers or waffles.

The conventional way of making filled pastry, particularly such as consists of wafer-like layers, is to coat or cover certain parts of the cake bottom layer with the filling material such as jam or the like by hand or by machine and to then put the other cake layer on. Large size cake in plate form is then cut up into small pieces as desired.

The present invention proposes to make such filled baked product which consists of a filler, top and bottom layers and possibly intermediate layers of in particular wafer-like material, in such a way that at least two endless sheets or strips of baked material are simultaneously produced and conveyed one above the other by means of a continuously working mechanism to be finally filled, also automatically and in continuous operation, with the fill stuff spread between the top and bottom strips and intermediate layers, which are produced in like manner, whereupon the strips of the finished product thus filled is cut up into small pieces as desired.

Such a procedure possesses the special advantage that baked products thus filled are not touched with the hands but purely handled solely by machine.

It has so become possible by means of this new method to unite in continuous process and in a very simple manner quite a number of filled intermediate layers with the top and bottom layers to thus produce so-called filled wafers. According to the kind of fill stuff used, it is possible to heat or/and to cool the filled strip after having introduced the layer or layers of fill stuff, and to then cut the finished baked product into pieces of the desired size.

This treatment is intended for solidifying the fill stuff the mass of which according to its constituents had been put into a state which is suitable for the filling process, that is by raising the temperature (in the case of fatty fillings) or by the use of water as solvent (in the case of sugar fillings). In the first case it is preferable to cool the strip after filling, in the second case it is preferable to heat the strip after filling in order to evaporate the water. It may, however, be advisable when using fill stuff of a special kind to first heat the strip and then to cool it.

The invention also proposes a mechanical arrangement for producing an endless sheet of baked material, this arrangement being specially adapted for use alongside with the procedure described above for making filled wafers. By means of this apparatus endless strings of wafer-like products in particular can be produced.

It is known to produce wafers by means of machines having two endless conveyer chains forming baking irons by one half of the baking irons being fastened on the lower and the other half on the upper conveyer chain respectively. When both conveyer chains meet, the lower baking iron after having received the necessary quantity of dough closes with the upper half the whole baking iron and, after it has passed the heated baking zone at the end of the machine, is opened again whereupon the finished pastry is taken out of the baking iron in single pieces.

As the wafer dough is prepared in comparatively liquid form because of the peculiar properties wafer pastry is to possess, such single baking irons must be provided with quite a number of openings to enable the steam forming during the baking process to escape from the baking irons after they are closed. Considerable parts of dough are extruded from these steam outlets. Such dough is then waste and hardly useable any more, for as a rule it is scorched.

The use of such single baking irons is uneconomic also for thermic reasons as, even if such baking irons are united in groups, a relatively very considerable radiation of heat sets in. Also the heating is not uniform which prevents a uniform product to be obtained. Furthermore, in removing the different wafer leaves from the single irons breakage occurs often which increases the waste.

The present invention does away with all these drawbacks, and an extraordinarily high degree of economy in operation as well as an improved uniform quality is obtained in the production especially of wafer products, while greatly reducing the breakage. The output by means of the apparatus is considerably higher than that of other machines used heretofore. Waste through dough parts being cast out of the steam outlets does not occur or only in a quite negligible degree because of the fact that the apparatus requires but few lateral steam exit openings, and removal of single wafer leaves from individual baking irons is not necessary.

A machine for making flat thin bake by means of heated conveying belts which run over rollers and take up the dough and in which the liquid wafer dough is simply poured between two endless metallic conveying belts, has also been proposed. In practice, work with such a machine is however not possible as no provision is made for closing the sides of the baking channel. The dough poured between these belts can therefore readily spread between them and will very likely leak out at the sides of both belts if too much is poured in, which would waste material and soil the machine, or the dough settles irregularly between both belts so that a baked sheet of constant width can never be obtained. But in any case because of the laterally open flanks of the baking channel, a good deal of dough is exhausted due to the steam developing during the baking process, such dough being thereby wasted.

Such drawbacks cannot occur in the baking machine of the present invention as its characteristic feature is that the channel formed by the endless metal belts is provided with side walls which run with the same speed of the metal belts and thus form a baking form channel which is closed on all sides, and whose parts cannot shift relatively to each other, and which discharges a continuous and evenly wide strip of baked material.

According to the invention a continuous stream of dough is introduced into the machine. In order to obtain a layer of dough distributed as evenly as possible directly after the dough is squirted on it, the dough is discharged from at least one nozzle in whose close proximity another nozzle is disposed through which compressed gases or compressed air escapes to blow the dough upon the travelling baking plates whereby it is sprayed about and spread over the plates.

The final distribution of the dough to obtain an absolutely uniform layer then takes place in the baking mold channel itself.

It is practical to squirt the dough on the lower metal belt directly before the spot where the two endless metal belts run together in order to prevent its setting and clogging before it spreads out.

The dough entering the heated baking mold channel discharges its excess of water as steam which escapes continuously through the inlet opening of the channel. Parts of dough carried by the steam are continuously carried back again to the baking mold channel through the movement of the endless belts and do not therefore get lost. In this way the plurality of steam outlet openings necessary in prior known can be totally done away with or be restricted to a few lateral ones.

In a preferred form of the invention, two endless metallic belts are provided of which the lower one has the cross section of a shallow trough according to the thickness and width of the desired wafer sheet, and of which the upper one is formed as cover with rims that overlap the lower belt.

The endless metal belts of the apparatus consist suitably of single pieces in plate form which are linked together. Their joints run in staggered position in the case of the two endless belts. As material for these plates iron and aluminum proved practical. However also other metals, alloys or plated metals may be used.

The features of the invention are more fully set forth in the accompanying drawings in which by way of example an apparatus for making wafer ware is illustrated. The same reference symbols designate the same parts in the different figures.

Fig. 2 is a cross sectional view of Fig. 1.

Fig. 3 is a diagrammatical view of two machines, one upon the other.

Figure 1:
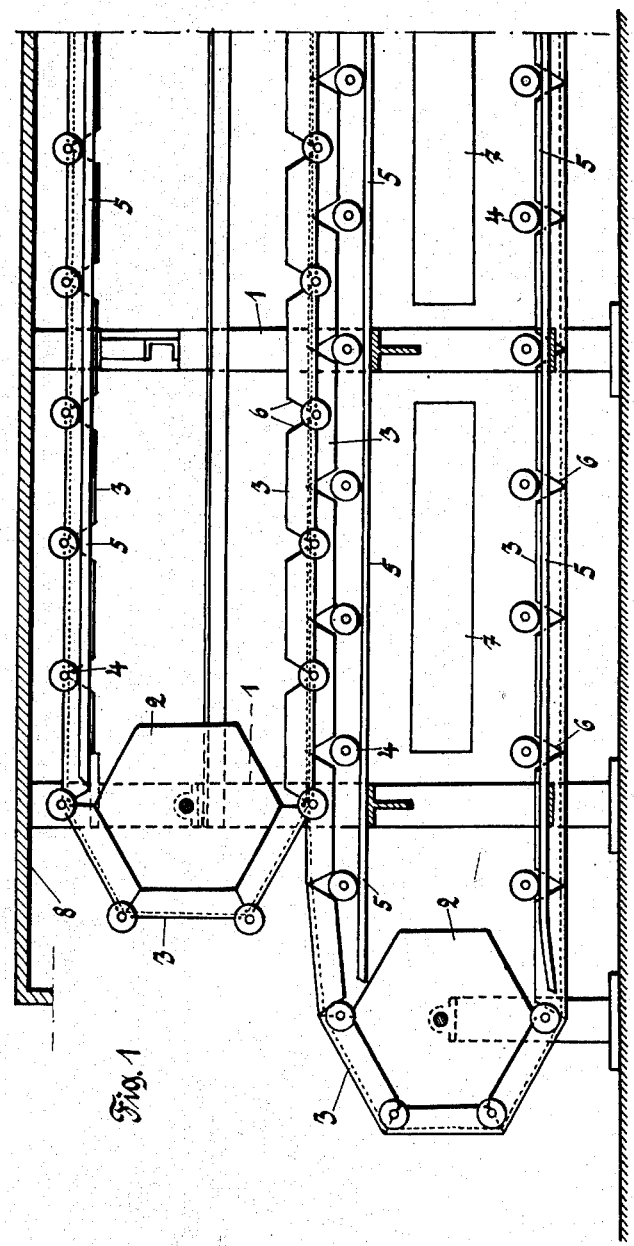
Fig. 1 is a longitudinal cross-sectional view of the apparatus.

Several supporting posts 1, erected parallel to each other, form the body framing of the machine. This frame work carries two endless belts which are driven by guide wheels 2. The belts consist of individual plate segments 3 carried by rollers 4 on guide rails 5 which are mounted on the machine framing.

Plates 3 are provided with chamfers 6 on their ends which permits the plates to turn around wheels 2, and the end edges of adjacent plates to abut in the horizontal reach so as to form an even and integrative surface. The drive of both belts is so arranged that the butt joints of the one belt are disposed just opposite the middle of a plate segment of the other. The heating contrivance 7 outlined in Figure 1 produces the baking temperature necessary for the baking mold channel, or tubular baking chamber, which is formed by the two belts. The whole machine can be enclosed in a protective housing 8.

Figure 4:
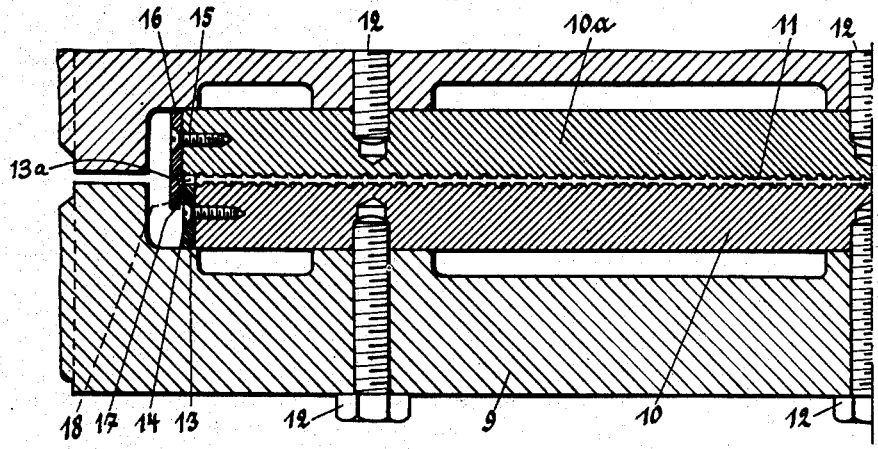
Fig. 4 is an enlarged cross sectional view through the baking mold channel.

The detailed construction of the different plate segments 3 of the endless belts is shown in Fig. 4. The plate support body 9 is provided on the side facing the other belt with plates 10 and 10a respectively of aluminum, for example, the plates having grooves 11 which are desirable for baking wafers. These plates are fastened by bolts 12 to supporting body 9.

In order to give the baking mold channel formed by the two endless belts the cross section of a shallow trough, plates 10 of the one plate belt, preferably the lower one, are provided with side pieces 13 which, according to the wafer thickness desired, project beyond the surface of plate 10. These side pieces 13 are fastened by means of screws 14 on the side of plate 10. Plate 10a of the other and preferably upper plate belt is broader by the thickness of side pieces 13 on each side. On this plate 10a a similar side piece 16 is fastened by means of screws 15 which now overlaps side piece 13 of plate 10 of the other plate belt. As shown at 17 the inner surface of the overlapping part of this side piece 13 is slightly bevelled at its end.

For the escape of the steam possibly forming as the dough sheet passes through the machine, small slots 13a in side pieces 13 are spaced from each other and communicate with corresponding grooves 18 in the part of side 16 that overlaps the other belt.

To produce filled wafer products two machines of the kind just described are disposed one upon the other as shown in Fig. 3. Between the wafer strips 19 and 20 issued from the baking mold channel, the fill material is squirted on by means of the diagrammatically outlined device 21. The strip thus forming, which in the case represented is composed of the two outside wafer layers with fill between them, passes then through a channel 22a which may be used as heating device, and then through a second channel 22b which may be used as cooling device. Then the strip is cut up into pieces of smaller size by means of the cutting or sawing device 22c moving along while cutting in the direction of movement of the strip.

Figure 5:
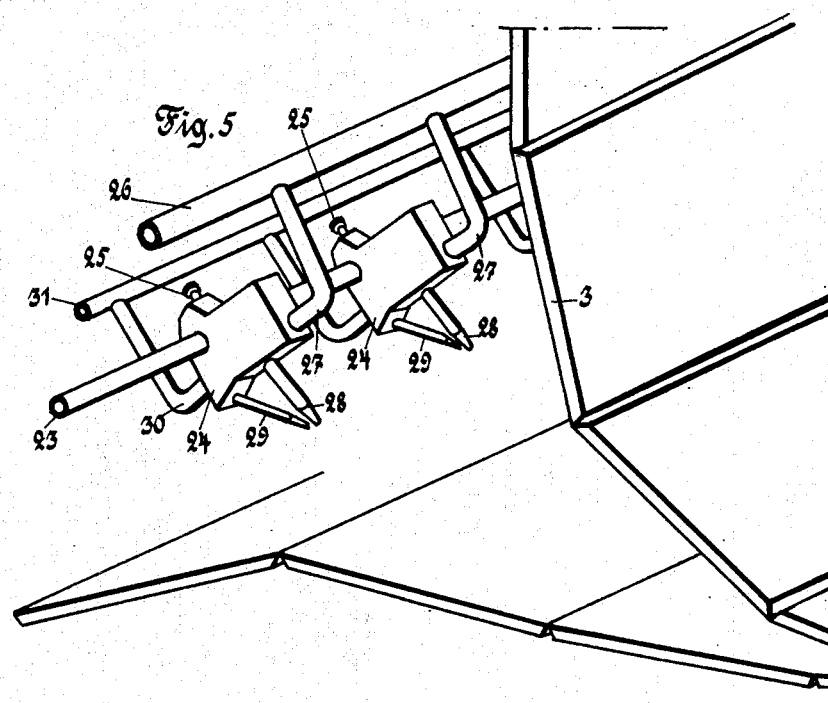
Fig. 5 is a perspective view of the injection nozzles with diagrammatically indicated plate belts.

The dough feeding arrangement shown in Fig. 5 consists of a support shaft 23 on which the different nozzle holders are so disposed that they are capable of sliding and swivelling on it. These nozzle holders can be retained in the position desired by means of set screws 25 on support shaft 23. By means of main conduit 26 and the branch conduits 27 leading to each nozzle holder, the liquid dough is fed to and then discharged through nozzle 28. For feeding the dough to the nozzle a pump, not shown, in the drawings may be used. The quantity of dough to be fed in a given time can in that case be precisely checked by means of valves etc.

In order to spread the dough discharged from nozzle 28 as broadly as possible and to also carry it as far as possible into the inlet opening of the baking mold channel formed by the two plate belts, beneath nozzles 28 further nozzles 29 are disposed from which compressed gas or compressed air is discharged. This gas or compressed air is fed to nozzle holder 24 through pipes 30 which branch off from main 31. The speed of the gas flow can be regulated by valves not shown in the drawings. The discharged gas or compressed air conveys the dough particles, as already mentioned, and blows them into the inlet opening of the baking mold channel where they spread out on the lower plate belt.

The most suitable number of nozzle holders to be distributed over the breadth of the plate ribbon depends on the consistency and kind of the dough to be dealt with. It can easily be determined by experience.

By changing the angle of inclination of nozzle 28 in respect to the spot on the lower plate belt in which the dough is squirted, this spot may be relocated if desired.

I claim:

1. An apparatus for producing a continuous sheet of baked dough comprising a plurality of flat faced metal plates joined to form, respectively, two articulated metallic belts, said belts being spaced in superimposed relation with the joints between the plates in one belt staggered with respect to the joints in the other belt, bridging means extending across the lateral side faces of said superimposed belts and coextensive therewith to form a tubular baking chamber, means for introducing dough into said chamber, means for heating said chamber to bake the dough, and venting means in said bridging means for permitting the escape of steam coming from the baking dough while confining the dough to said chamber.

2. An apparatus as in claim 1, said bridging means comprising flanges on the lateral side faces of said plates.

3. An apparatus as in claim 2, said bridging means further comprising the flanges on one of said plates being overlapped by the flanges on the plates of the superimposed belt.

4. An apparatus as in claim 3, said venting means comprising slots in the flanges of one of said plates, and grooves in the flanges of the plates of the superimposed belt communicating with said slots.

5. An apparatus as in claim 4, said means for introducing dough comprising a plurality of nozzles mounted for spraying dough under gas pressure into the inlet end of said tubular chamber.

6. An apparatus as in claim 5, further comprising means for adjusting the position of said nozzles.

7. An apparatus as in claim 6, further comprising means for receiving and thermally treating the baked dough as it is discharged between said belts.

References Cited in the file of this patent

UNITED STATES PATENTS

| Number | Name | Date |
| --- | --- | --- |
| 562,962 | Holmes | June 30, 1896 |
| 1,014,375 | Carpenter et al. | Jan. 9, 1912 |
| 1,263,317 | Garza | Apr. 16, 1918 |
| 1,318,292 | Laskey | Oct. 7, 1919 |
| 1,379,987 | Israel | May 31, 1921 |
| 1,391,805 | Subers | Sept. 27, 1921 |
| 1,465,326 | Zimmer | Aug. 21, 1923 |
| 1,477,842 | Narobe | Dec. 18, 1923 |
| 1,529,107 | Backus | Mar. 10, 1925 |
| 1,542,710 | Laskey | June 16, 1925 |
| 1,763,211 | Baker | June 10, 1930 |
| 1,771,506 | Mustin | July 29, 1930 |
| 2,001,792 | Lombi | May 21, 1935 |
| 2,006,919 | Haug | July 2, 1935 |
| 2,067,115 | Bogaty | Jan. 5, 1937 |
| 2,088,247 | Paton | July 27, 1937 |
| 2,156,810 | Garbutt | May 2, 1939 |
| 2,179,672 | Roys | Nov. 14, 1939 |
| 2,227,728 | Lombi | Jan. 7, 1941 |
| 2,445,884 | MacManus | July 27, 1948 |
| 2,503,771 | Roll | Apr. 11, 1950 |

FOREIGN PATENTS

| Number | Country | Date |
| --- | --- | --- |
| 651,349 | France | Oct. 9, 1928 |
| 876,472 | France | Nov. 6, 1942 |
| 979,372 | France | Apr. 25, 1951 |